United States Patent [19]

Semmler

[11] Patent Number: 4,483,968
[45] Date of Patent: Nov. 20, 1984

[54] PROCESS FOR THE MANUFACTURE OF A CEMENTITIOUS RESIN SOLUTION

[75] Inventor: Hans-Joachim Semmler, Hochheim am Main, Fed. Rep. of Germany

[73] Assignee: Hoechst Aktinegesellschaft, Fed. Rep. of Germany

[21] Appl. No.: 537,346

[22] Filed: Sep. 29, 1983

[30] Foreign Application Priority Data

Oct. 2, 1982 [DE] Fed. Rep. of Germany ....... 3236585

[51] Int. Cl.$^3$ ...................... C08F 283/06; C08L 61/10
[52] U.S. Cl. .................................. 525/401; 525/412; 525/491; 525/502
[58] Field of Search ............... 524/594, 247; 525/502, 525/504, 412, 414, 401, 398, 491

[56] References Cited

U.S. PATENT DOCUMENTS

| | | | |
|---|---|---|---|
| 2,813,846 | 11/1957 | Farber et al. | 524/593 |
| 3,244,648 | 4/1966 | Bornstein | 525/481 |
| 3,755,229 | 8/1973 | Johnson et al. | 524/541 |
| 4,302,380 | 11/1981 | Hesse et al. | 525/502 |

*Primary Examiner*—Theodore E. Pertilla
*Attorney, Agent, or Firm*—Connolly & Hutz

[57] ABSTRACT

Cementitious resin solutions for chemicals-resistant cements are prepared by dissolving a resin in furfuryl alcohol or preparing a resin solution by acidic condensation with the use of furfuryl alcohol. 0.01 to 0.1 equivalents of a primary amine per liter are added to the resin solution.

9 Claims, No Drawings

PROCESS FOR THE MANUFACTURE OF A CEMENTITIOUS RESIN SOLUTION

The present invention provides a process for the manufacture of a cementitious resin solution which is useful for preparing cements resistant to chemicals and containing furan rings in the macromolecule.

For linings, embedding and painting compositions in the chemical industry and other fields where aggressive chemicals may contact floors and walls, cements of synthetic resins are often used which contain furfuryl alcohol as solvent and usual resin resols are resin portion. These resin resols are prepared for example from phenol and formaldehyde, or furfural and formaldehyde; the macromolecule which forms containing furan or benzene rings. Furfuryl alcohol acts as so-called reactive thinner, that is, it is present in the cementitious resin solution in free form, and is incorporated by cross-linking into the final macromolecule of the duroplast on setting of the cement by the end user only.

Preparation of acid-proof resin coating compositions from phenol/formaldehyde resin and furfuryl alcohol or furfural is the subject of German Pat. Nos. 852,906 and 874,836.

Setting of the resin solution is performed by the catalytic action of acidic substances, optionally with simultaneous application of heat and pressure. An example for the setting at elevated temperature is given in German Pat. No. 874,836. In the case where furan resins are used as binders for cements of synthetic resins, the so-called cold-setting is routine. In addition to the hardener, the cement mass contains furthermore resin, a filler (for example sand, quartz powder, titanium dioxide, graphite, carbon black) and the binder (for example furfuryl alcohol). Filler and catalyst (hardener) are premixed in most cases and united with the resin solution by the end user only. A special hardener suitable for cold-setting systems is described in German Offenlegungsschrift No. 2,034,602.

As catalysts, sulfuric, hydrochloric, phosphoric, amidosulfonic acid, organic sulfonic acids (for example paratoluenesulfonic acid), other organic acids and hydrogensulfates, especially sodium hydrogenosulfate, are normally used.

In addition to high chemical stability of the resin, a good processability of the resin solution and the cement mass is desirable. In some cases it is advantageous to increase the viscosity of the resin solution without increasing the resin proportion. When the resin solution is insufficiently viscous, there is the risk that on lining or painting of vertical walls the cement mass runs off downward during the setting. The present invention solves this problem.

There has been found a process for the manufacture of a cementitious resin solution for chemicals-resistant cements by dissolving a resin in furfuryl alcohol or preparing a cementitious resin solution having a viscosity not exceeding 1,600 mPa.s (measured at 20° C.) by acid condensation with the use of furfuryl alcohol, which comprises adding from 0.01 to 0.1 equivalents of a primary amine per liter to the cementitous resin solution. This invention allows to decrease the resin portion of the resin solution without changing the viscosity. Preferred is the addition of from 0.02 to 0.05 equivalents of primary amine per liter. The viscosity is increased in a time reaction after the addition of the amine. On storage, the final viscosity is attained after a few days, depending on the temperature. In some cases, a further increase of viscosity cannot be observed any more after 24 hours.

After having added the amine to the cementitious resin solution, it is therefore recommended to wait at least 24 hours before processing the solution to a cement mass. At elevated temperature the final viscosity is attained earlier (at 60° C. after about 2 hours). When preparing the resin solution by acidic condensation with the use of furfuryl alcohol it is recommended to stop the condensation on attaining a viscosity of 1,600 mPa.s (measured at 20° C.) at the latest. Otherwise there is the risk that a too small amount of residual furfuryl alcohol is contained in the resin and the primary amine added according to the invention is not effective any longer.

Suitable amines are monoamines, diamines and polyamines. Preferred are monoamines, especially aliphatic monoamines, and diamines. Examples are methylamine, ethylamine, propylamine, butylamine, higher fatty amines having up to 18 carbon atoms and primary cyclic amines such as cyclohexylamine. Aromatic amines alone are not very effective and should be used only together with other amines, for example strongly basic polyalklene-imines. Advantageously primary aliphatic monoamines used have a pK value of 3 to 6. Aminocarboxylic and aminosulfonic acids are not suitable. The presence of hydroxy groups in the molecule is not disturbing; on the contrary, compounds of the alkanolamine type (ethanolamine, 1-amino-2-hydroxypropane) are especially efficient.

Examples of aliphatic diamines to be used in accordance with the invention are diaminoethane and diaminopropane, examples of aromatic diamines are 4,4'-diaminodiphenylmethane and 4,4'-diaminodiphenylpropane. As a matter of fact, when using a compounds having two primary amino groups in the molecule the viscosity increase of the cementitious resin solution is considerably higher than in the case of adding the equivalent amount of a monoamine. Examples of suitable polyamines having two primary amino groups are dipropylenetriamine, diethylene-triamine and the homologous polyethylene-imines having up to 18 carbon atoms at most.

Appropriate resins which are dissolved in furfuryl alcohol are all kinds commonly used, especially synthetic resins, for example phenol resins, furfuryl alcohol resins, furfuryl aldehyde resins and mixtures of these resins. The manufacture of the furan resins is known to those skilled in the art for example from A. P. Dunlop and F. N. Peters, The Furans, New York 1953. Advantageously, the viscosity at 20° C. of the resin used is below 1,500 mPa.s, especially below 1,300 mPa.s. Preferred are phenol/formaldehyde resins and phenol/furan/aldehyde resins. For example, an alkylphenol can be converted with formaldehyde to a resol which is then processed to a final resol after having added furfuryl alcohol. Depending on the operation mode, final resols are obtained the viscosity range of which is from 600 to 5,000 mPa.s. The virtual resin amount (non-volatile residue) in such final resols is in the range of from 30 to 70 weight %. The higher the virtual resin amount is, the higher is the viscosity.

When about 1 weight % of ethanolamine is added to a resin solution (about 40% resin amount) having a viscosity of 500 mPa.s, and the batch is stirred at room temperature or slightly elevated temperature, the viscosity rises finally to about 800 to 900 mPa.s. When equivalent amounts of a diamine are added, still higher viscosities are the result. In the case where an undesirably high viscosity results after addition of the amine, any intended viscosity can be easily adjusted by mixing with the initial (amine-free) solution. In all these cases, the resin proportion of the solution is not affected.

On the other hand, when the resin proportion in the resin solution is to be reduced without altering the viscosity, this can be achieved by adding an amine to the initial resin solution and, the viscosity increase being terminated, readjusting the initial viscosity by addition of furfuryl alcohol (as reactive thinner). The amount of amine and the possibly required amount of furfuryl alcohol can be determined precisely by corresponding preliminary tests on a small scale and then be calculated for large batches.

Usually, the viscosity increase of freshly prepared resin solution is slow and may take several weeks. It is surprising to observe that although after the addition of amine according to the invention the viscosity of the same resin solutions increases rapidly, there is no substantial further increase after some days. It is furthermore surprising that the addition of amines does not adversely affect the setting of the resins in the ready-for-use cement masses by means of the acids or acid precursors usually added. In contrast thereto, in the process according to U.S. Pat. No. 2,813,846 the sulfonic acid acting as hardener is mixed with benzidine and added to the resin solution containing furfuryl alcohol in order to reduce the setting time.

The chemical stability of the cements containing the amine additive corresponds on the whole to that of cements without amine. Moreover, it has been observed that the content of toxic furfural which is often present in the resin solution as by-product is reduced after the addition of the amines.

The following examples illustrate the invention.

EXAMPLE 1

(a) Preparation of a resin solution

According to Example 1a of German Offenlegungsschrift No. 2,926,053, 7 g of nonylphenol containing 2% of dinonylphenol and 45.6 g of diphenylolpropane are dissolved in 400 g of xylene, and reacted at 50°-60° C. with sodium hydroxide solution. Subsequently, 650 g of 37% formaldehyde solution are stirred in. After several hours, the reaction mixture is acidified with sulfuric acid, and the aqueous phase is separated. 780 g of furfuryl alcohol are added to the organic phase, and the xylene is removed. A resin solution containing about 50% of residue (actual portion of resin) having a viscosity of about 700–800 mPa.s is obtained.

(b) Addition of the amino compound 2.0 g of ethylenediamine are stirred into 1,000 g of this resin solution. After a storage time of 3 days, the viscosity of this solution is measured at 25° C. and amounts to about 925±25 mPa.s. After a further 4 days' storage at room temperature, the viscosity increase has stabilized; a viscosity of about 1,150±50 mPa.s is the result. This viscosity range remains constant even at further storage. The actual portion of resin (residue) remains unchanged.

(c) Adjustment of the viscosity

The solution of Example 1b having a viscosity of 1,150±50 mPa.s is mixed in a ratio of 1:1 with the initial resin solution of Example 1a. The mixture obtained has likewise a residue of 50%, and the viscosity is about 1,100 mPa.s. Any viscosity of about 700 to 1,200 mPa.s can be adjusted by altering the mixing ratio accordingly. Analogously, considerably lower viscosity values can be obtained by mixing the solution of Example 1b with furfuryl alcohol (with reduction of the residue).

(d) According to Example 1b of German Offenlegungsschrift No. 2,926,053, a pulverulent filler/catalyst mixture was prepared from 93 g of coke powder, 0.5 g of phosphoric acid, 4 g of amidosulfonic acid and 2 g of oxalic acid. 100 g of this cement powder were mixed with 40–55 g of resin solution of Example 1c (depending on the intended consistency) to give a ready-for-use cement. The properties of this cement with respect to processability and stability correspond to those of known cement compositions.

EXAMPLE 2

Similar cement masses as that of Example 1d can be manufactured with the use of the resin solutions of Example 1c and a cement powder on the basis of quartz powder and 2–4% of paratoluenesulfonic acid as hardener.

EXAMPLE 3

Table 1 shows the influence of the amino group-containing additives on the furan resin solution of Example 1a. For this purpose, the resin solution was mixed with the amine and kept 24 hours at room temperature. A content of 0.2% of amino group-containing compound is sufficient to decrease the furfural content below 0.2%. The low molecular monoamines have obviously a rather insignificant influence on the viscosity, while the diamines increase the viscosity to a far greater extent.

EXAMPLE 4

Tables 2 and 3 show the time dependence of the viscosity of the furan resin solution modified with amino group-containing additives. It is observed that the viscosity increase is terminated after a short time, after 28 days at the latest.

EXAMPLE 5

Table 4 shows the influence of some amino group-containing substances on the furfural content. It has been observed (see Test No. 4) that even at an initially extremely high furfural content (2%) the furfural content can be decreased to below 0.2% by operating in accordance with the invention.

TABLE 1

| | Influence of amino group containing additives of furan resins solutions | | |
|---|---|---|---|
| No. | Additive | Viscosity increase as compared to starting solution (mPa · s) | Furfural content |
| 1 | — | — | greater than 0.25% |
| 2 | 0.26% ethanolamine | 0 | 0.08% |
| 3 | 0.5% ethanolamine | 0 | 0.06% |
| 4 | 0.3% cyclohexylamine | 65 | 0.19% |
| 5 | 0.5% benzylamine | 60 | 0.16% |
| 6 | 0.25% ethylendiamine | 170 | 0.1% |
| 7 | 0.5% butylamine | 30 | 0.1% |
| 8 | 0.7% ethylamine | 5 | 0.1% |
| 9 | 0.5% isopropylamine | 30 | 0.1% |
| 10 | 0.1% 4,4'-diaminodiphenylmethane | 120 | 0.2% |

TABLE 2

Time dependence of the viscosity of furan resin solutions containing amine additives at 20° C. storage temperature

| No. | Additive | Viscosity (mPa · s) | | |
|---|---|---|---|---|
| | | 1 day | 28 days | 60 days |
| 1 | 0.5% ethanolamine | 930 | 1155 | 1156 |
| 2 | 0.3% cyclohexylamine | 990 | 1040 | 1230 |
| 3 | 0.3% benzylamine | 990 | 1050 | 1080 |
| 4 | 0.1% 4,4'-diaminodiphenylmethane | 920 | 970 | 990 |

TABLE 3

Time dependence of the viscosity of furan resin solutions containing amine additives at 50° C. storage temperature

| No. | Additive | Viscosity (mPa · s) | | |
|---|---|---|---|---|
| | | 1 day | 28 days | 60 days |
| 1 | 0.5% n-butylamine | 840 | 1300 | 1460 |
| 2 | 0.7% ethylamine | 810 | 1330 | 1450 |
| 3 | 0.5% isopropylamine | 860 | 1210 | 1510 |
| 4 | 0.5% ethanolamine | 930 | 1310 | 1420 |

TABLE 4

Influence of amine-containing additives on the furfural content of different furan resin solutions

| No. | Resin solution | Additives | Furfural content |
|---|---|---|---|
| 1 | furan resin soln. acc. to Example 1 a | 0 | >0,2% |
| 2 | as 1 | 0.5% ethanolamine | ≦0,1% |
| 3 | 50% soln. as 1 50% furfuryl alcohol | 0.5% ethanolamine | ≦0,1% |
| 4 | 50% soln. as 1 48% furfuryl alcohol 2% furfural | 2.2% ethanolamine | ≦0,1% |

What is claimed is:

1. A process for the manufacture of a cementitious resin solution for chemicals-resistant cements by dissolving a phenol-furan-formaldehyde resin or phenol-formaldehyde resin in furfuryl alcohol or preparing a cementitious phenol-furan-formaldehyde resin solution having a viscosity not exceeding 1,600 mPa.s (measured at 20° C.) by acid condensation with the use of furfuryl alcohol, which comprises adding from 0.01 to 0.1 equivalents of a primary amine selected from the group consisting of methylamine, ethylamine, propylamine, butylamine, higher fatty amines having up to 18 carbon atoms, cyclohexylamine, ethanolamine, 1-amino-2-hydroxypropane, diaminoethane, diaminopropane, 4,4-diaminodiphenylmethane, 4,4'-diaminodiphenylpropane, dipropylenetriamine, diethylenetriamine and mixtures thereof per liter to the cementitious resin solution and allowing the cementitious resin solution to react for at least 24 hours after additon of the amine.

2. The process as claimed in claim 1 which comprises using ethanolamine as primary amine.

3. A process for the manufacture of an acid-proof cementitious resin composition by adding fillers and an acid hardener to a cementitious phenol-furan-formaldehyde resin or phenolformaldehyde resin solution containing furfuryl alcohol, which comprises adding from 0.01 to 0.1 equivalents per liter of a primary amine selected from the group consisting of methylamine, ethylamine, propylamine, butylamine, higher fatty amines having up to 18 carbon atoms, cyclohexylamine, ethanolamine, 1-amino-2-hydroxypropane, diaminoethane, diaminopropane, 4,4'-diaminodiphenylmethane, 4,4'-diaminodiphenylpropane, dipropylenetriamine, diethylenetriamine and mixtures thereof to the cementitious resin solution at least 12 hours before the addition of the acid hardener.

4. A process for the manufacture of a hardenable cementitious resin solution of increased viscosity for use in forming a chemical-resistant cement by means of a hardening reaction, said hardenable cementitious resin solution having been prepared by dissolving, in furfuryl alcohol, a phenolic resin, a furfuryl alcohol resins, furfuryl aldehyde resin, or a mixture of these resins, or by preparing a cementitious resin solution comprising an acid condensation product of a phenolic resin and furfuryl alcohol and having a viscosity not exceeding 1,600 mPa.s, measured at 20° C., said process comprising the steps of:

increasing the viscosity of said hardenable cementitious resin solution by adding thereto in the amount of 0.01 to 0.1 equivalents per liter a primary amine agent consisting essentially of:

an aliphatic primary monoamine having 1 to 18 carbon atoms and a pK value of 3 to 6; cyclohexylamine; an alkanolamine; 4,4'-diaminodiphenylmethane; 4,4'-diaminodiphenylpropane; an aliphatic diamine; a polyalkylene imine having two primary amine groups; and mixtures thereof; and permitting the resulting resin/amine mixture to react for at least 12 hours after addition of the primary amine agent to the cementitious resin solution, thereby obtaining a hardenable cementitious resin solution of increased viscosity.

5. A process according to claim 4 wherein said resulting amine/resin mixture is permitted to react for at least 24 hours before any further processing thereof.

6. A process according to claim 4, wherein the primary amine agent consists essentially of ethanolamine.

7. A process for making an acid-proof cementitious resin composition from the said resulting amine/resin mixture of claim 4, comprising the additional step of adding to said mixture fillers and an acidic hardener at least 12 hours after the addition of the primary amine agent.

8. A process according to claim 7 wherein said fillers and acidic hardener are added after the increasing viscosity of said resulting amine/resin mixture has substantially stabilized.

9. A process according to claim 4, wherein the primary amine agent is free of the compounds, 4,4'-diaminodiphenylmethane or 4,4'-diaminediphenylpropane, unless said compounds are present in admixture with a said aliphatic primary monoamine, a said alkanolamine, cyclohexylamine, a said aliphatic diamine, a said polyalkylene imine having two primary amine groups, or mixtures thereof.

* * * * *